United States Patent [19]
Brassil et al.

[11] Patent Number: 5,629,770
[45] Date of Patent: May 13, 1997

[54] DOCUMENT COPYING DETERRENT METHOD USING LINE AND WORD SHIFT TECHNIQUES

[75] Inventors: John T. Brassil, Berkeley Heights; Steven H. Low, Bridgewater; Nicholas F. Maxemchuk, Mountainside; Lawrence P. O'Gorman, Madison, all of N.J.

[73] Assignee: Lucent Technologies Inc., Murray Hill, N.J.

[21] Appl. No.: 414,857

[22] Filed: Mar. 31, 1995

Related U.S. Application Data

[63] Continuation-in-part of Ser. No. 170,619, Dec. 20, 1993.
[51] Int. Cl.⁶ .................. H04N 1/419; G09C 1/06
[52] U.S. Cl. .................. 358/261.1; 358/404; 380/4; 380/51; 380/55; 380/56; 399/366; 399/183
[58] Field of Search .................. 358/261.1, 401, 358/400, 402, 403, 404, 261.3, 261.2; 355/201, 203, 204, 209, 218; 380/20, 18, 28, 51, 55, 56, 3, 4; 341/178, 183, 173, 174; G09C 1/06

[56] References Cited

U.S. PATENT DOCUMENTS

| | | | |
|---|---|---|---|
| 4,995,082 | 2/1991 | Schnorr | 380/23 |
| 5,027,398 | 6/1991 | Miyoshi | 380/4 |
| 5,077,795 | 12/1991 | Rourke et al. | 380/55 |
| 5,144,665 | 9/1992 | Takaragi et al. | 380/30 |
| 5,235,642 | 8/1993 | Wobber et al. | 380/25 |
| 5,243,655 | 9/1993 | Wang | 380/51 |
| 5,291,243 | 3/1994 | Heckman et al. | 355/201 |
| 5,436,974 | 7/1995 | Kovanen | 380/51 |
| 5,444,779 | 8/1995 | Daniele | 380/3 |
| 5,479,507 | 12/1995 | Anderson | 380/3 |
| 5,509,074 | 4/1996 | Choudhury et al. | 380/23 |
| 5,513,264 | 4/1996 | Wang et al. | 380/51 |

*Primary Examiner*—Edward L. Coles, Sr.
*Assistant Examiner*—Madeleine AV Nguyen

[57] ABSTRACT

A method is provided that deters the illicit copying of electronically published documents. It includes publishing a plurality of copies of electronically created material to be distributed to a plurality of subscribers. Each copy of subscriber's document has a unique identification code embedded in the document. The arrangement of the code on the document is based on the line-shifting and word-shifting techniques. This is to minimize the effects from noise and distortions on future illicit copies to simplify detection and decoding of the unique code. A codebook is created to correlate each unique code with each subscriber.

16 Claims, 8 Drawing Sheets

FIG. 5
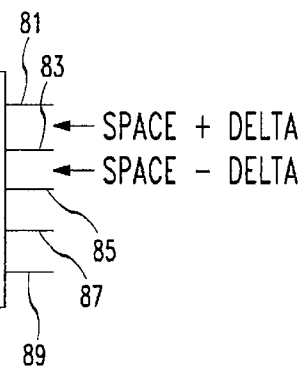
This is a method of altering a document by vertically shifting the location of text lines to uniquely encode the document. The encoding is most easily applied to the format file. The embedded code word may be decoded from the format file or bitmap.
← SPACE + DELTA
← SPACE − DELTA
FIG. 6
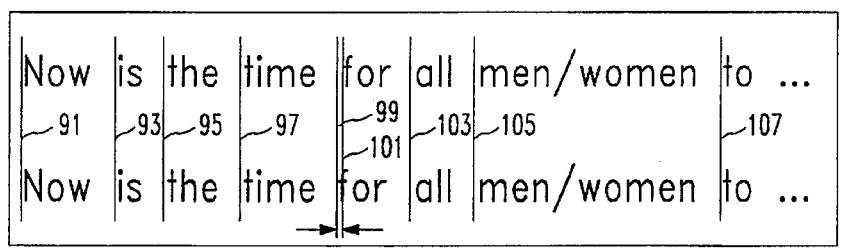
FIG. 7
Now is the time for all men/women to ...
Now is the time for all men/women to ...

DOCUMENT COPYING DETERRENT METHOD USING LINE AND WORD SHIFT TECHNIQUES

CROSS REFERENCE

This is a continuation-in-part of co-pending application Ser. No. 08/170,619 filed on Dec. 20, 1993; the disclosure of which is incorporated herein.

BACKGROUND OF THE INVENTION

1. Field of the Invention

The present invention involves methods of deterring illicit copying of electronically published documents by creating unique identification codes specific to each subscriber. Each copy of the published document has a unique arrangement of electronically created material, e.g. print material or display material, which is not quickly discernable to the untrained human eye and not destroyed by distortion or noise of a copying machine. These unique identification codes discourage illicit copying and enable a publisher/copyright owner to analyze illicit copies to determine the source subscriber.

2. Detailed Background

When the quality of reproductions from copy machines became comparable with the original, the cost of copies was reduced to a few pennies per page, and the time it took to copy a page was reduced to a second or less, then copy machines started to present a threat to publishers.

The problem of identifying illicit copies is intensified due to minute distortion and noise inherent in physical copying. These distortions are normally greater in the horizontal direction when the document is reproduced on a copy machine. Conversely, when a facsimile machine is used, the distortion is more predominate in the vertical direction. Preventing an individual from duplicating a document that is in his possession is an extremely difficult, if not impossible task. Instead of trying to prevent duplication of documents, the present invention is directed to making electronic publishing more acceptable by making it possible to identify the original owner of a bitmap version of the text portion of a document. The present invention should be adequate to discourage much of the copying and distribution that might otherwise occur. A result of the present invention method is that a publisher or copyright owner can more readily determine who the original belonged to when reproduced copies are found.

SUMMARY OF THE INVENTION

The present invention is directed to a method of deterring the illicit copying of electronically published documents. It includes utilizing a computer system to electronically publish a plurality of copies of a document having electronically created material thereon for distribution to a plurality of subscribers and operating programming within the computer system so as to perform the identification code functions. The steps are to encode the plurality of copies each with a separate, unique identification code, the identification code being based on a unique arrangement of the electronically created material on each such copy using both line and word shifting, creating a codebook to correlate each such identification code to a particular subscriber and decoding methods to overcome and compensate for noise and distortion on the illicitly copied material due to the copy machine.

BRIEF DESCRIPTION OF THE DRAWINGS

The present invention is more fully understood when the present invention specification herein is taken in conjunction with the drawings appended hereto, wherein:

FIG. 5 illustrates line-shift encoding with line space measurements shown qualitatively;

FIG. 6 shows word-shift encoding with vertical lines to emphasize normal and shifted word spacing;

FIG. 7 illustrates the same text as in FIG. 6 but without vertical lines to demonstrate that both unshifted and shifted word spacing appears natural to the untrained eye;

DETAILED DESCRIPTION OF THE PRESENT INVENTION

One object and general purpose of techniques of the present invention is to provide a means of discouraging the illegitimate copying and dissemination of documents. In the present invention methods, document marking embeds a unique identification code by way of line and word shifting techniques within each copy of a document to be distributed, a codebook correlating the identification code to a particular subscriber (recipient) is maintained and document manipulation and decoding is performed to counter noise and distortion brought on by the copying means. Hence, examination of a recovered document (or in certain cases, a copy of a distributed document) reveals the identity of the original document recipient.

In the present invention, document marking is achieved by altering text formatting, i.e. lines and words. The alterations used in marking a document in the present invention method enables the publisher to embed a codeword that can be identified for security (traceability) purposes, and alter features with as little visible change of appearance as possible.

Certain types of markings can be detected in the presence of noise, which may be introduced in documents by printing, scanning, plain paper copying, etc. The preferred embodiment of the present invention combines word shifting and line shifting to overcome the detection errors due to this noise.

"Encoded" documents using the present invention methods can provide security by being coded specifically for each site, subscriber, recipient, or user (hereinafter referred to as "subscriber"). Then, any dissemination of an encoded document outside of the intended subscriber may be traced back to the intended subscriber.

Figure 1:
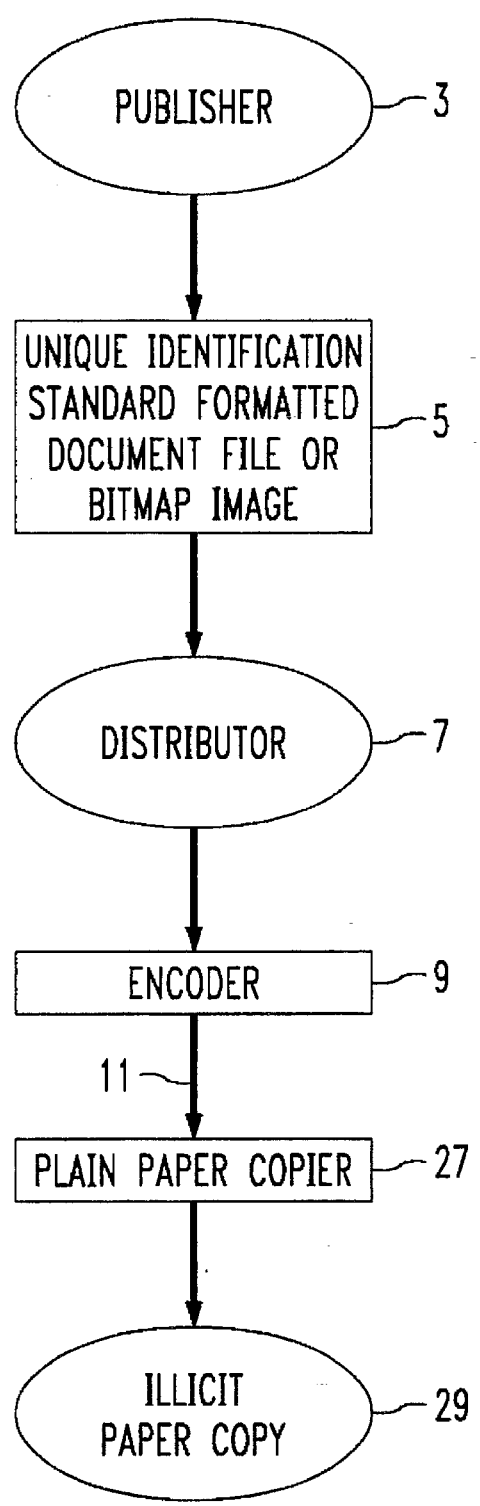
FIG. 1 illustrates a flow diagram of an overview of preferred embodiments of the present invention methods.

An overview of document production, distribution, and user interaction according to the present invention is illustrated in FIG. 1. This shows the path a document can follow from the publisher 3 to an illicit user through a regular paper copy distribution channel 11 (i.e. a user receives a paper journal, etc. from the publisher). Variations could, of course, be made to the flow chart of FIG. 1 without exceeding the scope of the present invention. For example, an illicit user could scan a legal version with a scanner and then electronically reproduce illicit copies. The present invention methods cover documents that are applicable along any of these or similar types of distribution paths, e.g. published electronically and distributed via fax. Document coding is performed prior to document dissemination as indicated by encoder 9.

Figure 2:
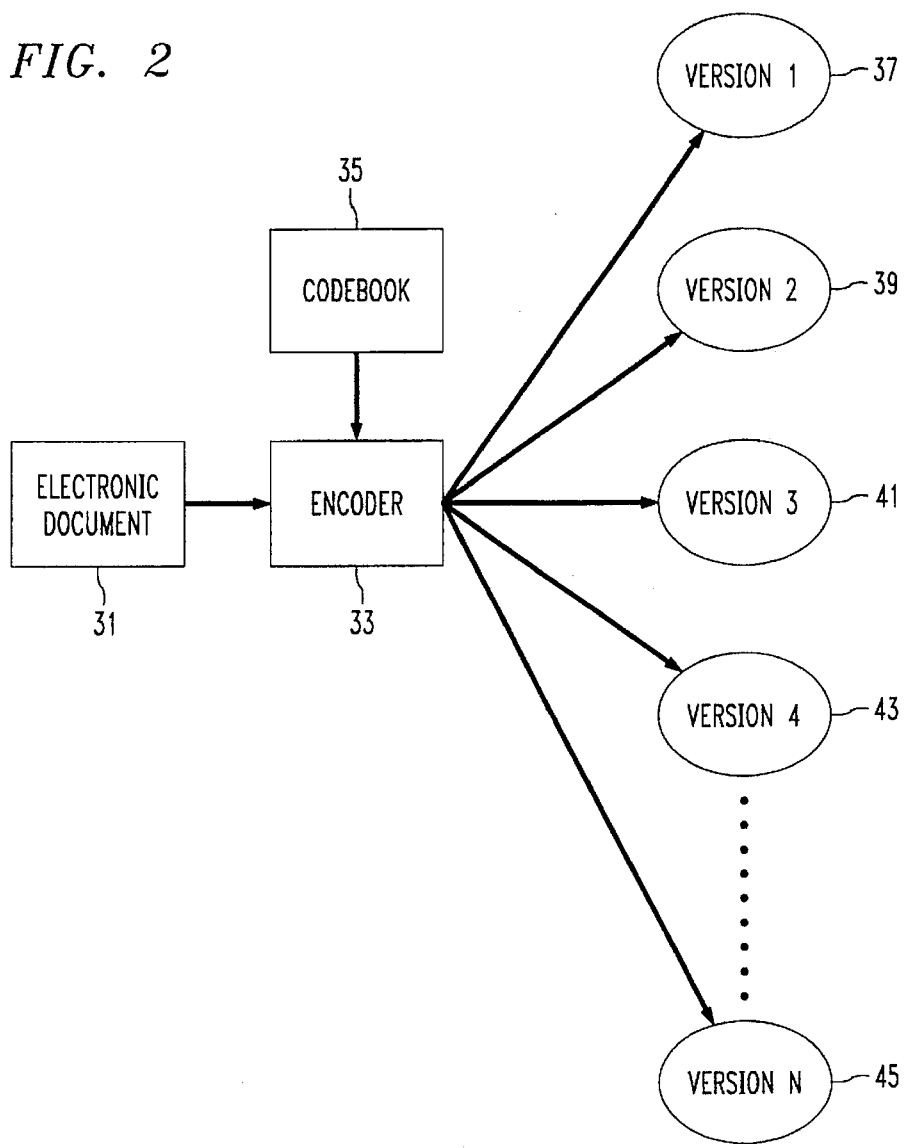
FIG. 2 illustrates a flow diagram of an encoder operation in a present invention method.

Documents are encoded while still in electronic form (FIG. 2). The techniques to encode documents may be used in either of the two following forms: images or formatted document files. The image representation describes each page (or sub-page) of a document as an array of pixels. The image may be black and white (also called bitmap), grayscale, or color. In the remainder of this text, the image representation is simply referred to as a "bitmap", regardless of the image color content. The formatted document file representation is a computer file describing the document content using such standard format description languages as PostScript, troff, etc.

In a typical application, a bitmap is generated from a formatted document file. It is assumed that once a subscriber sees a document (e.g. displays a page on a workstation monitor), then he or she can capture and illegitimately disseminate that document. Therefore, coding must be embedded before this subscriber stage. Thus, as in FIG. 2, the electronic document 31 is encoded at encoder 33 according to a preselected set of alterations set up in codebook 35. (It is not essential that the codebook predate the encoding, in some embodiments, the codebook may be created from logging of identification codes as used, to correlate these to specific subscribers, or vice versa.) The encoded documents are each uniquely created as version 1 (37), version 2 (39), version 3 (41), version 4 (43) . . . through version N (45).

A combination of encoding techniques is used in the present invention methods and these relate to altering lines and blocks of words without the need to add textual, graphical, alphabetical, numerical or other unique identifiers, and to thereby not alert an illicit copier to the code. Thus, common to both techniques is that the codeword is embedded in the document by altering particular aspects of already existing features. For instance, consider the codeword 1101 (binary). Reading this code right to left from the least significant bit, the first document feature is altered for bit 1, the second feature is not altered or altered in the opposite direction for bit 0, and the next two features are altered in the original direction for the two 1 bits. It is this type of feature that distinguishes the particular encoding methods used in the present invention. They are further detailed as follows:

(1.) Line-Shift Coding—a method of altering the document format file or image bitmap by shifting the locations of text-lines to uniquely encode the document. This code may be decoded from the format file or bitmap. Lines are shifted vertically. The method provides the highest reliability among these methods for detection of the code even in images degraded by severe noise. To maximize the detection, only relatively full lines are used and each line that is encoded has non-encoded lines above below it as control lines.

(2.) Word-Shift Coding—a method of altering the document format file or image bitmap by shifting the locations of blocks of words within the text to uniquely encode the document. A line of text is typically divided into three blocks of words where the center block is shifted. The outside blocks are used as controls. This coding may be decoded from the format file or bitmap. This method in preferred embodiments using document format file alteration is similar in use to method (1). It typically provides less visible alteration of the document than method (1), but decoding from noisy image may be less easily performed.

Both text-line coding and word-shift coding apply to a formatted document file. In the following discussion, it is assumed that the formatted document file is in Adobe Systems, Incorporated PostScript—the most common Page Description Language Format used today. However, the present invention is also applicable to other document file formatting programs along with bitmap files. PostScript describes the document content a page at a time. Simply put, it specifies the content of a text-line (or text-line fragment such as a phrase, word, or character) and identifies the location for the text to be displayed. Text location is marked with an x-y coordinate representing a position on a virtual page. The location of the text can be modified by an arbitrarily small amount on the virtual page. However, most laser printers in use today have somewhat less resolution (e.g. 1/300 inch).

In one embodiment of the present invention method, prior to distribution, the original PostScript document and the codeword are supplied to an encoder. The encoder reads the codeword, and searches for the lines which are to be moved. Upon finding a line to be moved, the encoder modifies the original (unspaced) PostScript file to incorporate the line spacing adjustments. This is done by increasing or decreasing the y coordinate of the line to be spaced. For each textline that has been adjusted, the line is divided into three groups of words with a large middle group. This middle group is shifted slightly left or right from their normal position. The other two groups are the control groups, and remain stationary. This maintains the overall text-line length, and produces little qualitative change on the text image. The encoder output is an "encoded" PostScript document ready for distribution in either electronic or paper form to a subscriber.

Figure 3:
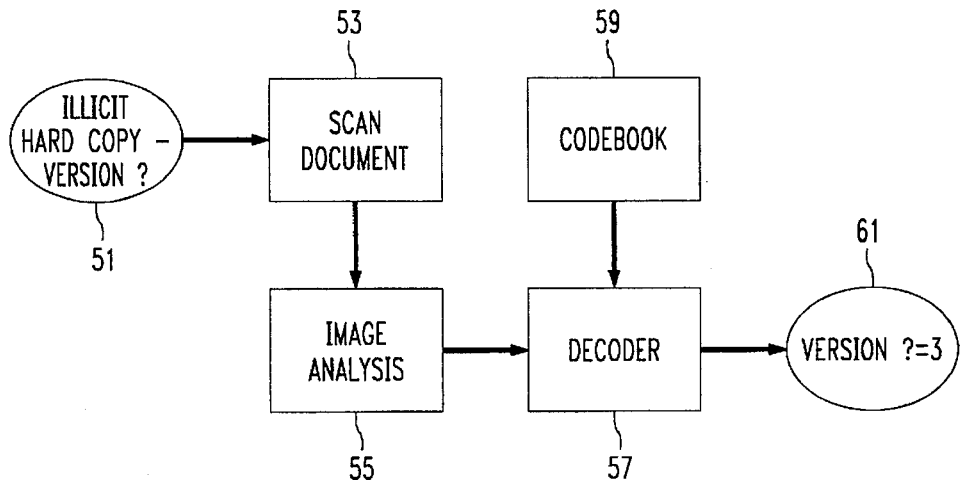
FIG. 3 illustrates a flow diagram of a decoder operation in a present invention method.

FIG. 3 illustrates how a publisher may identify the original recipient (subscriber) of a marked document by analysis of a recovered paper copy of the document. That is, given a questionable hard copy 51, copy 51 is scanned by scanner 53, analyzed by computer 55, decoded with decoder program 57, matched to codebook 59, to determine the source or subscriber version 61. For example, the "decoder" analyzes the line spacing, and extracts the corresponding codeword, uniquely identifying the original subscriber.

A page (or pages) of a recovered illicit copy of the document may be electronically scanned to produce a bitmap image of the page. The bitmap image may preferably be subjected to noise reduction to remove certain types of extraneous markings (i.e. noise introduced by printing a hard copy, plain paper copying, electronic scanning, smudges, etc.). The bitmap image may then be rotated to ensure that the text lines are perpendicular to the side page edge. A "profile" of the page is found—this is the number of bits on each horizontal scan line in the image. The number of such scan lines vary, but typically is around 40 per text-line. The distance between each pair of adjacent text-line profiles may then be measured. This is done by measuring the difference between centroids (i.e. centers of mass) of adjacent line profiles. The interline spacings are then analyzed to determine if spacing has been added or subtracted.

The detection method used for word shifting is a correlation method. This treats a profile as a waveform and decides whether the profile originates from a waveform whose middle block has been shifted left or right. This process, repeated for every line, determines the codeword of the document—this uniquely determines the original subscriber. One advantage of this method relative to the other methods covered herein is that the code can be decoded without the original. Further, this method is likely to be the most noise resistant.

Figure 4:
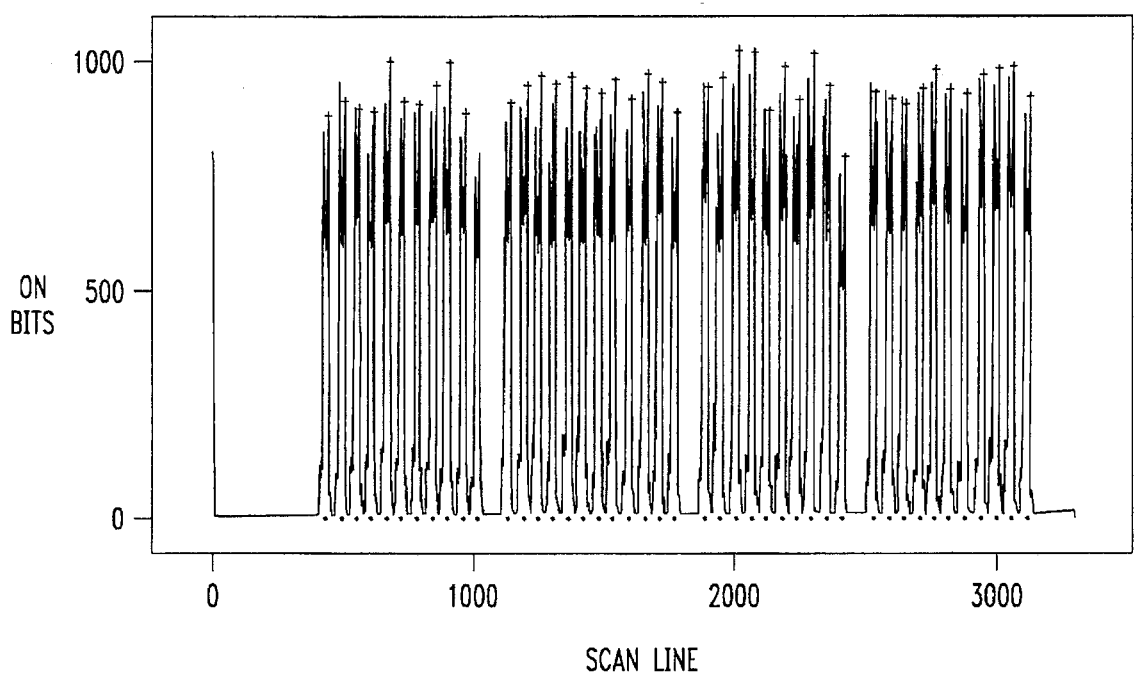
FIG. 4 shows a projection profile of a recovered document using text line-shift encoding.

FIG. 4 shows a graph of a line spacing profile of a recovered document page. The scan line of the baseline of each text-line is marked with a "+". The scan line of the centroid of each text-line is marked with a dot. Decoding a page with a line spacing may involve measuring the distance between adjacent text-line centroids and determining whether space has been increased, decreased, or left the same as the standard.

Illustrative Review of Altering Techniques

FIG. 5 illustrates an example of line-shift encoding. Note that the second line 83 is shifted down from first line 81 by approximately 1/150 inch, which equals delta. Due to differential coding, this causes the spacing between the first line 81 and the second line 83 to be greater than normal and the spacing between second line 83 and third line 85 to be less than normal. The spaces between third line 85, fourth line 87 and fifth line 89 are normal.

FIGS. 6 and 7 illustrate word-shift encoding. FIG. 6 shows vertical lines 91, 93, 95, 97, 99, 101, 103, 105 and 107. These lines are vertical guidelines to show the positioning of each of the words in the top and bottom lines of FIG. 6. The word "for" has intentionally been shifted and, therefore, rests at vertical line 99 in the bottom line of text and against vertical line 101 in the top line of text. FIG. 7 shows the same text as in FIG. 6, but without the vertical lines to demonstrate that both unshifted and shifted word spacing appears natural to the untrained eye.

Application of Error Correction

Due to noise which may be introduced in the recovered document, the identification process is subject to error. Clever choices of the set of codewords used to space lines (based on Error Correcting Codes) will be used to minimize the chance of detection error. This will establish a tradeoff between the number of potential recipients of a document (i.e. the number of codewords) and the probability of correct identification. To illustrate, the following discussion gives detail of how line-shift/wordshift decoding may preferably be enhanced by noise removal.

In general, in the present invention methods, a line-shift/word-shift decoder extracts a codeword from a degraded bitmap representation of an encoded document (decoding a recovered, unmodified formatted document file is trivial). An illicit copy of an encoded document may be recovered in either electronic or paper form. If paper is recovered, a page (or pages) of the document is electronically scanned producing a bitmap image of the page(s). Extracting the code from an image file is not as straightforward as doing so from the format file. Since the image contains ON and OFF bits, rather than ASCII text and formatting commands, pattern recognition techniques must be used first to determine the content. Furthermore, since noise may be present, image processing techniques are performed to reduce noise and make the job of pattern recognition more robust. Some of the techniques used for document decoding from the image are as follows:

Salt-and-Pepper Noise Removal—Inking irregularities, copier noise, or just dirt on the paper can cause an image to contain black specks in background areas, and white specks within foreground areas such as text. Since this noise interferes with subsequent processing, it is desirable to reduce it as much as possible.

A kFill filter is used, which is designed to reduce salt-and-pepper noise while maintaining document quality. It does so by discriminating noise from true text features (such as periods and dots) and removing the noise. It is a conservative filter, erring on the side of maintaining text features versus reducing noise when those two conflict and has been described for document clarification and is known by the artisan.

Deskewing—Each time that paper documents are photocopied and scanned, the orientation of the text lines on the page may be changed from horizontal because of misorientation—skewing—of the page. In addition, a photocopier may also introduce skewing due to any misalignment of its optics. The success of subsequent processing requires that this skew angle be corrected—that the text lines be returned to the horizontal in the image file.

One approach for deskewing by use of the document spectrum, or docstrum, technique is a bottom-up segmentation procedure that begins by grouping characters into words, then words into text lines. The average angle of the text lines is measured for a page, and if this is non-zero (not horizontal), then the image is rotated to zero skew angle. Rotation, followed by bilinear interpolation to achieve the final deskewed image, is a standard digital image processing procedure that can be found in the published literature.

Text-Line Location—After deskewing, the locations of the text lines can be found. A standard document processing technique called the projection profile is used. This is simply a summation of the ON-valued pixels along each row. For a document whose text lines span horizontally, this profile will have peaks whose widths are equal to the character height and valleys whose widths are equal to the white space between adjacent text lines. The distances between profile peaks determine interline spacing.

Besides 'salt-and-pepper' noise and skewing, the most severe distortions are translation and expansion/shrinkage of the text, blurring, random shifting, and uniform change in intensity. Occasionally, a copy may have a horizontal or vertical strip across the page that is darker or lighter. Such a strip does not significantly affect the centroid of a horizontal profile since each block is typically narrow and tall. A horizontal strip does not affect the word-shift detection since the entire observed horizontal profile g(x) will be multiplied by a constant. A vertical strip does not affect word-shift detection and should be compensated for before detection is attempted.

Figure 8:
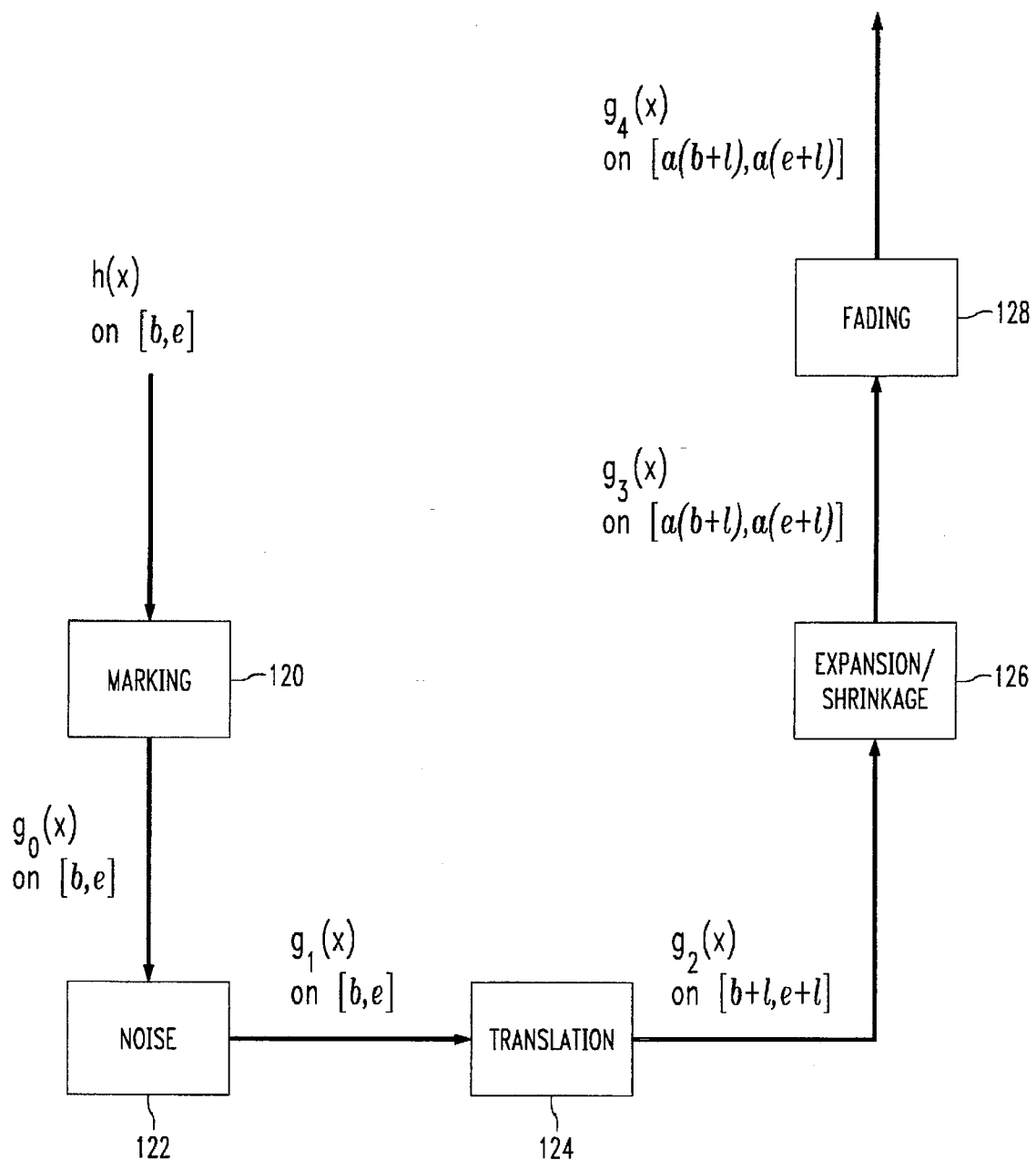
FIG. 8 shows a model of various distortions.

The 'salt-and-pepper' noise and excessive skewing are removed from the bitmap image before the profile is compiled. Other distortions are modeled, as in FIG. 8. The image is marked (120) and the original profile h(x) becomes $g_o(x)$. The undistorted profile $g_o(x)$ is corrupted by an additive noise (122) into $$g_1(x) = g_0(x) + N(x), \, x \in [b, e].$$

Here the random process N(x) models all the noise not accounted for an introduced by distortion compensation to be described. It is translated by 1 (124) into the profile $$g_2(x) = g_1(x-l), \, x \in [b+1, e+1)]$$

and then expanded or shrunk (126) by a factor a>0 into $$g_3(x) = g_2\left(\frac{x}{a}\right), x \in [a(b+l), a(e+l)]$$

Finally, the profile is faded (128) into the observed profile $$g_4(x) = \frac{1}{\gamma(x)} g_3(x), x \in [a(b+l), a(e+l)]$$

where $\gamma(x) > 0$ is a gain factor.

In the following, described are simple methods to estimate $g_1(x)$ from the observed profile $g_4(x)$.

As noted earlier, $\gamma(x) \neq 1$ only if there is one or more vertical strips going down the page and $g_4(x)$ under consideration is a vertical profile. In this case, the fading gain can be approximated by a piecewise constant function:

$$\gamma(x) = \sum_i \gamma_i 1 (x \in (x_i, x_{i+1}))$$

where the indicator function $1(x \in I)$ is 1 if x is an interval I and 0 otherwise. Here, $\{x_i\}$ partitions the interval $[a(b+1), a(e+1)]$. It can be assumed that fading distorts the adjacent control lines in a similar manner. Denoted by $c_0(x)$, the adjacent control line profiles are transformed into $c_1(x) \ldots c_4(x)$ in a way similar to what effects $g_0(x)$. Then the profile before the fading stage is $$c_3(x) = c_0\left(\frac{x}{a} - l\right)$$

and the observed profile is $$c_4(x) = \sum_i \frac{1}{\gamma_i} c_3(x) 1(x \in (x_i, x_{i+1}))$$

Integrating both sides over each interal $[x_i, x_{i+1}]$, $\gamma_1$ is estimated by $$\gamma_i = \frac{\int_{x_i}^{x_{i+1}} c_3(x)dx}{\int_{x_i}^{x_{i+1}} c_4(x)dx} = \frac{aC_0\left(\frac{x_i}{a} - l, \frac{x_{i+1}}{a} - l\right)}{C_4(x_i, x_{i+1})}$$

where the profile before the fading stage is used in the second equality. Here, $C_j(x,y) j=0,4$, denotes $$\int_x^y c_j(x)dx$$

By assumption, the same fading gain $\gamma_i$ distorts the marked line on each interval $(x_i, x_i+1)$. Hence for $x \in [a(b+1), a(e+1)]$, $$g_3(x) = \sum_i \gamma_i g_4(x) 1(x \in [x_i, x_{i+1}])$$

The translation 1 and expansion factor $a>0$ can be estimated by measuring the beginning position $y_0$ and the ending position $y_1$ that defines the three-block profile $g_3(x)$. Then:

$$l = \frac{ey_0 - by_0}{y_1 - y_0} \text{ and } a = \frac{y_1 - y_0}{e - b}$$

With these, $g_1(x)$ is obtained from $g_3(x)$ by $$g_1(x) = g_3(a(x+1)), x \in [b, e].$$

Denote by $1_i$ the interval $(x_i, x_{i+1})$. Substituting the above estimated the profile $g_1(x)$, $x \in [b,e]$, from the observed profile $g_4(x)$ by $$g_1(x) = \sum_i \gamma_i g_4(a(x+l)) 1(a(x+l) \in I_i)$$

where a, 1 and $\gamma_i$ are given above.

In one preferred embodiment, the present invention line-shift decoder measures the distance between each pair of adjacent individual text line profiles (within the page profile). This is done by measuring the difference between centroids of adjacent line profiles, as mentioned above. A baseline is the logical horizontal line on which characters sit; a centroid is the center of mass of a text line. As seen in FIG. 5, discussed above, each text line produces a distinctive profile with two peaks, corresponding to the midline and the baseline. The peak in the profile nearest the bottom of each text line is taken to be the baseline; if equal peak values occur on neighboring scan lines, the largest value scan line is chosen as the baseline scan line. To define the centroid of a text line precisely, suppose the text line profile runs from scan line y, y+1 ... to y+w, and the respective number of ON bits/scan line, are h(y), h(y+1), ..., h(y+w). Then the text line centroid is given by $$\frac{yh(y) + \ldots + (y+w)h(y+w)}{h(y) + \ldots + h(y+w)}$$

The measured interline spacings (i.e. between adjacent centroids) are used to determine if white space has been added or subtracted because of a text line shift. This process, repeated for every line, determines the codeword of the document—this uniquely determines the original recipient.

The decision rules for detection of line shifting in a page with differential encoding are described. Suppose text lines i−1 and i+1 are not shifted and text line i is either shifted up or down. Centroid spacings between adjacent text lines in the original unspaced document are not necessarily uniformly spaced. In centroid-based detection, the decision is based on the difference of centroid spacings in the spaced and unspaced documents. More specifically, let $s_{i-1}$ and $s_i$ be the centroid spacings between lines i−1 and i, and between lines i and i+1, respectively, in the spaced document; let $t_{i-1}$ and $t_i$ be the corresponding centroid spacings in the unspaced document. Then the decision rule is:

if $s_{i-1} - t_{i-1} > s_i - t_i$: decide line i shifted down
otherwise: decide line i shifted up An error is said to occur if the decoder decides that a text line was moved up (down) when it was moved down (up).

Noise Experiment Results

The equipment used in the experiment was as follows:
1. Ricoh FS1S 400 dpi Flat Bed Electronic Scanner
2. Apple LaserWriter IIntx 300 dpi laser printer
3. Xerox 5052 plain paper copier.

The printer and copier were selected in part because they are typical of the equipment found in wide use in office environments. The particular machines used could be characterized as being heavily used but well maintained. Xerox and 5052 are trademarks of Xerox Corp. Apple and Laser-Writer are trademarks of Apple Computer, Inc. Ricoh and FS1S are trademarks of Ricoh Corp.

A page of text consisting of alternating symbols of 'l' and '—' on each line was copied ten times, then each copy was scanned in to produce a bitmap image, The bitmap image was processed to correct for excessive skewing (rotation of text) and to remove 'salt-and-pepper' noise. Then the vertical profile of each text-line is compiled. The translation, expansion/shrinkage, and fading were compensated for. The experiment was performed for both photocopies in the portrait and landscape orientation. When photocopied in the portrait orientation, the page consisted of 27 lines, each line having 40 'l's, giving a sample size of 1080 'l's; for landscape orientation, it had 22 lines, each line having the same number of 'l's, giving a sample size of 880 'l's.

Figure 9:
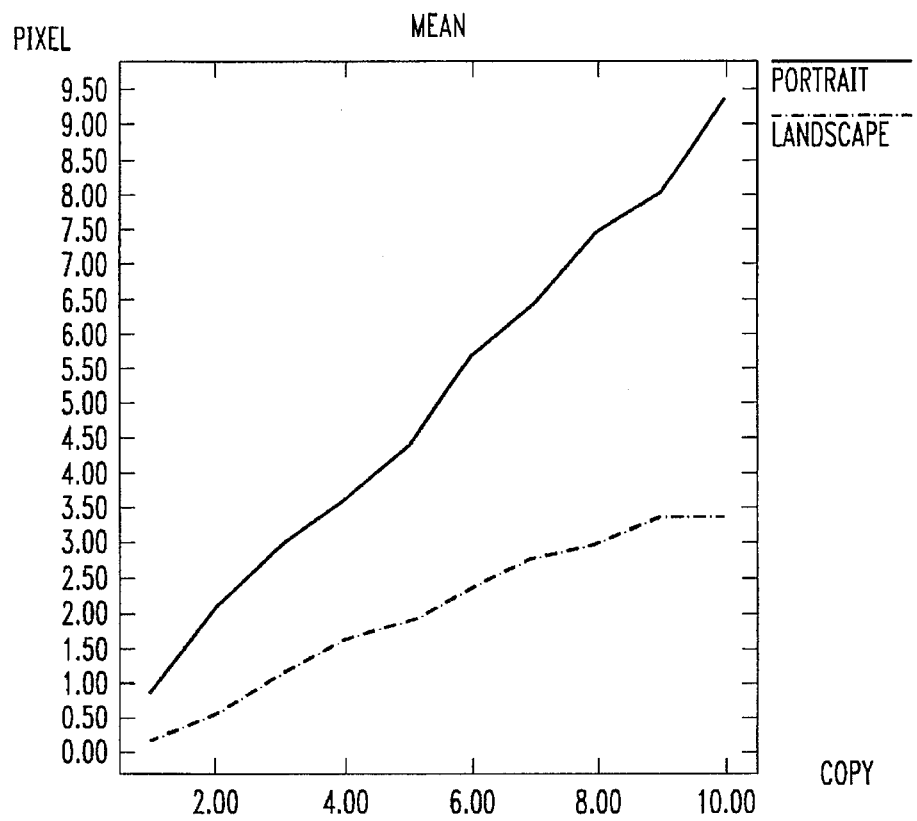
FIG. 9 shows the graphic representation of the mean and variance of centroid displacement due to noise.
Figure 9:
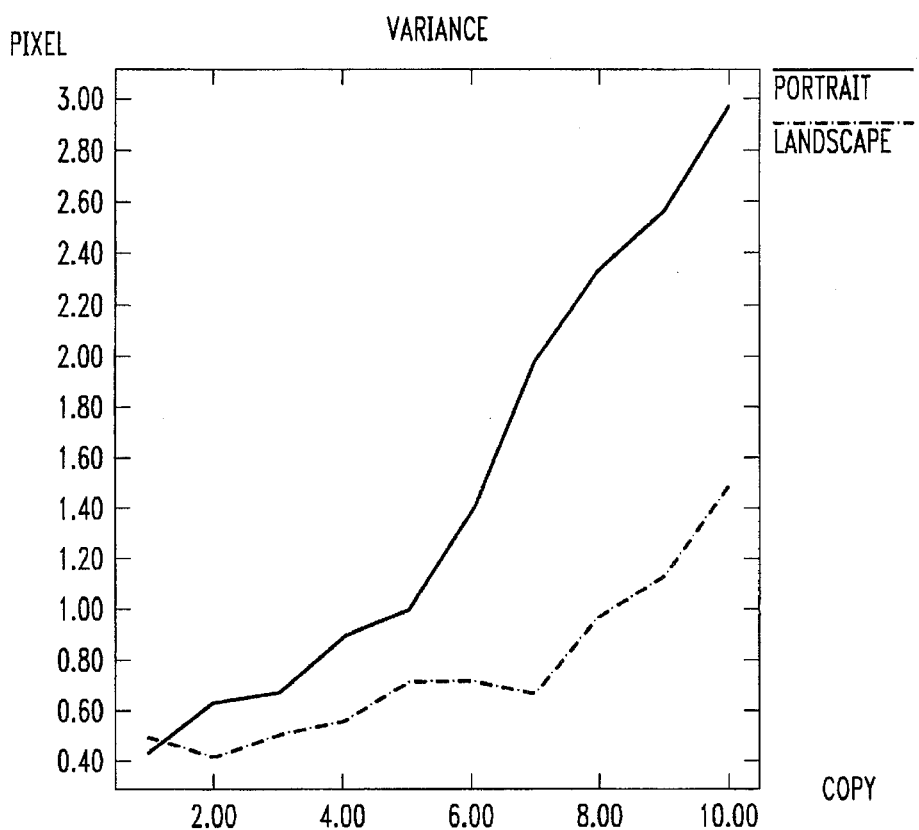

Unlike a typical profile for regular English text, the vertical profile of each textline has easily identifiable columns corresponding to vertical strokes 'l's. Referring to the laser printed copy as the 0th copy; the ith copy, i=1, ..., 10, was produced by photocopying copy i-1. For stroke j on the ith copy, i≧0, measured its 'distance' $d_{dij}$ relative to the left text-margin. Here, j=1 ..., 1080 for portrait-style photocopies, and j=1, ..., 880 for landscape-style photocopies. Since a stroke, or the corresponding column in the profile, is typically 3–5 pixels wide, this 'distance' is taken to be the centroid of the column. Then $$n_{ij}=d_{ij}-d_{0j}, i \geq 1$$

measures the displacement of the jth stroke on the ith copy from its original position. For each copy i, calculated is the sample mean and variance by averaging over j. They are plotted in FIG. 9 as a function of copy generation. It shows that the mean displacement on the profile copied in portrait orientation is about 2.5 times that in the landscape orientation. More importantly the variance in the portrait orientation is about twice as much as that in the landscape orientation.

That the noise is much more severe in one direction than the other becomes intuitive in retrospect. Major sources of distortion are printing, photocopying, scanning and subsequent processing of the bitmap image and profile. What was observed was due to the remaining noise after 'salt-and-pepper' noise, excessive skewing, translation and expansion/shrinkage of entire text, and fading have been compensated for. Apparently, noise introduced by the copier dominated that from other sources. Careful examination of the profile indicated that random shifting of words within the text is more severe in the portrait than landscape copies, leading to our experimental result. The reason for this lies in the electrophotographic process in the copier.

The electrophotographic process takes six distinct steps. The first three steps produce an image of the document on a photoreceptor. This image is transferred from the photoreceptor onto paper in the fourth and fifth step. In the last step, the photoreceptor is cleared for the next copying, which repeats these six steps. These six steps are done at different parts of the copier. In most copiers, the photoreceptor material is mounted on a drum or a conveying belt which rolls through the six different points of the copier where these steps are performed. The paper rolls from the supply paper tray through where the fourth and fifth steps are performed, and then out of the copier. The random shifting of the image is more severe in the direction of the paper path, which is also the direction in which the photoreceptor moves, than in the orthogonal direction. For the copying option selected, this direction happened to be the horizontal direction on the text.

Discussion and Implications of Image Defects

Image defects resulting from plain paper copying are all too familiar. The defects most significantly affecting the detection results are now briefly discussed. The discussion is largely qualitative—a more quantitative discussion of image defects and their physical underpinnings is beyond the scope of this overview.

The primary troublesome defect encountered was text line skew, or the rotation of text lines about a point. In the experiment, skew angles were observed between [−3°, +3°]. Text line skew was largely removed by image rotation, albeit at the expense of the introduction of some distortion.

Blurring also increased with the number of copies produced, indeed ultimately making the 10th copy barely legible. Blurring seemed to have surprisingly minor implications in detection performance. Plain paper copies were produced at the copier's nominal "copy darkness" setting; blurring typically increases with copy darkness. As the number of copies increased, darkness generally varied over a page; regions of severe fading were sometimes observed. It is unclear whether blurring or fading is more detrimental to decoding performance.

Expansion or shrinking of copy size is another potential problem. It is not unusual to discover a 4% page length or width change after 10 copies. Further, expansion along the length and width of a page can be markedly different. Copy size changes forced us to use differential encoding—that is, encoding information in the relative rather than absolute shifts between adjacent text lines.

Simple inspection of the copies shows both a wide range of horizontal and vertical displacements and other image defects (e.g. salt-and-pepper noise) of little consequence. Perhaps the most startling degradation is "baseline waviness" (i.e. nonconstant skew across a text line). It is remarkable that detection is not dramatically affected by this particular image degradation.

An Analytical Noise Model

Figure 10:
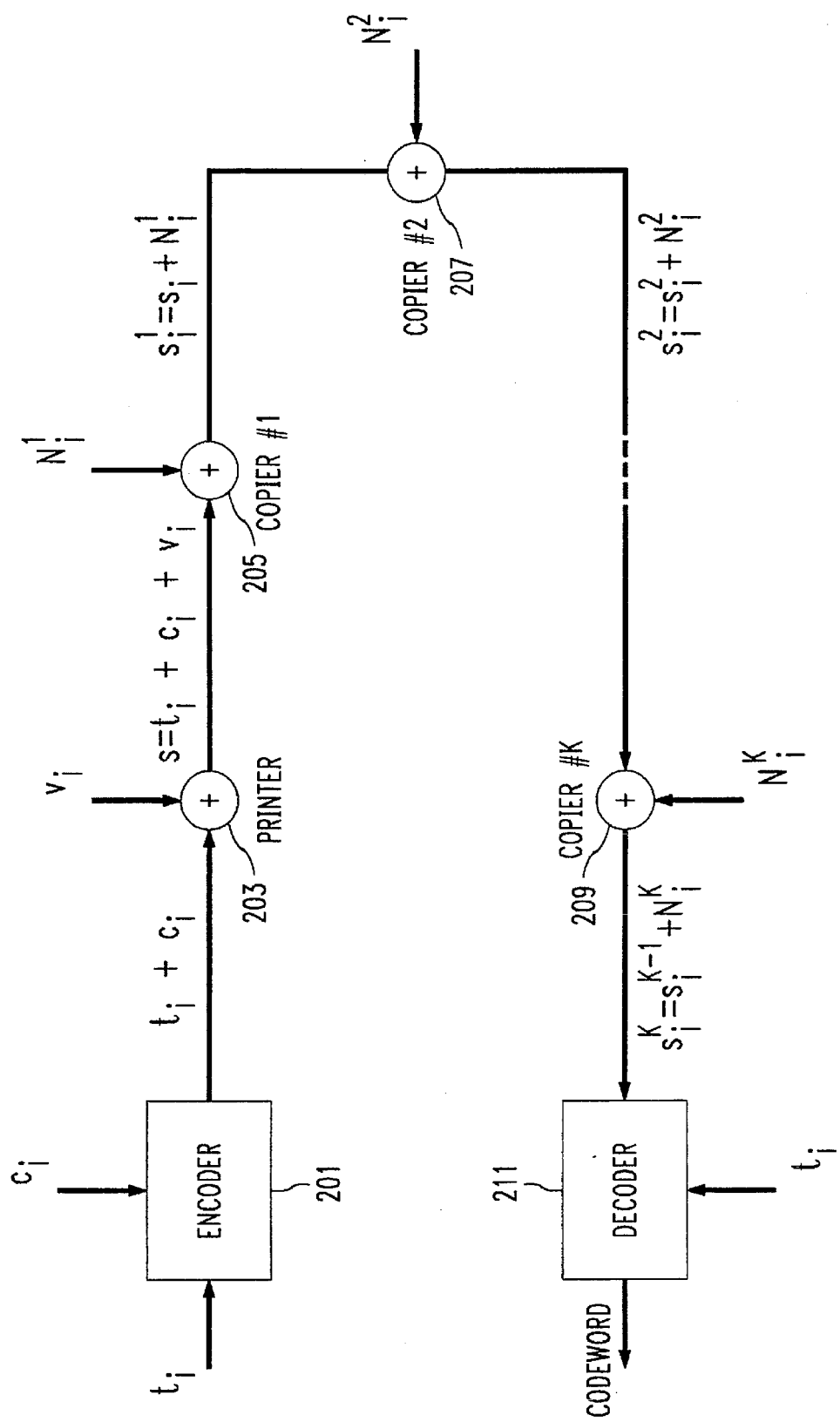
FIG. 10 shows a schematic diagram for a noise accumulation model.

In this subsection, a simple model of the noise affecting text line centfolds is presented. There are two types of noise. The first type of noise models the distortions in printing the document; the second type models the distortions in copying. This second type of noise increases with the number of copies while the first type does not. The accumulation of noise is illustrated in FIG. 10. This illustrates the theoretical model as a document travels from encoder 201, to the original printer 203, first copier 205, second copier 207, the last of a series of copiers, i.e. copier K 209, and then decoder 211.

A page of text with n+1 text lines yields n+1 vertical coordinates $Y_1, \ldots, Y_{n+1}$, that represent the centroids of the text lines, measured from, say, the top page margin. The centroid spacings, or distance in scan lines between adjacent centroids, are given by $$t_i=Y_{i+1}-Y_i, i=1, \ldots, n.$$

Hence, for detecting line-shifts, a page of n+1 text lines is effectively described by n centroid spacings.

In FIG. 10, the ith line spacing shift $c_i$ is positive if extra space has been added, negative if space has been subtracted, and zero otherwise. The printer noise, $v_i$, models the cumulative effect (on the ith centroid spacing) of distortions introduced by printing, scanning and image processing. Making the jth copy adds a random noise $N^j_i$ to the ith centroid spacing. At the decoder input after the Kth copy, the original centroid spacing $t_i+c_i$ has been distorted to be $s_i^K$. Since the physical processes of printing, scanning, and image processing are independent of copying, it is assumed that the random variables $v_i$, i=1, ..., n, are independent of $N^j_i$, i=1, ..., n, j=1, ..., K.

Let a page of n+1 text lines be described by the centroid spacings $t_1, \ldots, t_n$. It is assumed that the printer noise distorts these spacings to $s_i=t_i+c_i+v_i$, i=1, ..., n where $v_i$, i=1, ..., n, are independent and identically distributed Gaussian random variables. This assumption is supported by the measurements, which yield a mean of $\mu_1=0.0528$ pixel and variance of $\delta_1^2=0.140$ pixel$^2$.

Next, consider the effect of noise introduced by copying. Consider the 0th copy of a page of n+1 text lines with centroid spacings $s_1, \ldots, s_n$. Let the first copy of the page be described by centroid spacings $s_1^1, \ldots, s_n^1$, where $$s_i^1 = s_i + N_i^1, i=1, \ldots, n.$$

Here, $N_i^1$ is the random noise that summarizes the cumulative effect of skewing, scaling, and other photographic distortions in the copying process, on the ith centroid spacing $s_i$. After the jth copy, $j \geq 1$, the centroid spacings are denoted by $s_1^j, \ldots, s_n^j$. As above these centroid spacings are given by $$s_i^j = s_i^{j-1} + N_i^j, i=1, \ldots, n. \text{ where } N_i^j \text{ is the noise introduced}$$
by copying the j–1st copy. Hence, the centroid spacing $s_i^j$ is corrupted by the total noise:

$$s_i^j = s_i + (N_i^1 + \ldots + N_i^j).$$

The measurements taken suggest a surprisingly simple statistical behavior for the random copier noise. The noise components $N_i^j$, $j=1,2,\ldots,K$, are well modeled by Gaussian random variables with mean $\mu=0.066$ pixel and variance $\delta^2=0.017$ pixel$^2$. The measurements suggest that the random variables $N_i^1, \ldots, N_i^j$ are also uncorrelated, and by normality, they are thus independent. Hence, the centroid spacing $s_i^j$ on the jth copy is $$s_i^j = s_i + n_i^1, i=1, \ldots, n$$

where $n_i^j$ is Gaussian with mean $j\mu$ and variance $j\delta^2$.

Printer noise and copier noise are now combined to estimate the error probability under centroid detection. Consider three adjacent, differentially encoded text lines labeled such that lines i–1 and i+1 are unshifted while line i is shifted (up or down) by $|c|$ pixels. Let $t_{i-1}$ and $t_i$ be the centroid spacings between these lines in the original unspaced document and let $s_{i-1}$ and $s_i$ be the corresponding spacings on the 0th copy of the encoded document. Then $$s_{i-1} = t_{i-1} + c + v_{i-1},$$

$$s_i = t_i - c + v_i,$$

where $c=+1$ if line i is shifted down and $c=-1$ if line i is shifted up. Let $s'_{i-1}$ and $s_i^j$ be the corresponding centroid spacings on the jth copy of the document. Then $$s'_{i-1} = t_{i-1} + c + v_{i-1} + \eta'_{i-1}$$

$$s_i^j = t_i - c + v_i + \eta_i^j$$

where $\eta_i^j$ are defined prior.

Suppose the jth copy of the document is recovered and is to be decoded. Applying the above equations to the detection rule:

if $v_{i-1} - v_i > \eta_i^j - \eta'_{i-1} - 2c$: decide line shifted down otherwise: decide line shifted up Since the random variables $v_{i-1}$, $v_i$, and $\eta'_{i-1}$, $\eta_i^j$ are mutually independent, the decision variable
D $\triangleq (v_{i-1} - v_i) + (\eta'_{i-1} - \eta_i^j)$ is Gaussian with zero mean and variance $2(\delta_1^2 + j\delta^2)$.

Hence, the probability that a given line is decoded in error is $$p(D > -2c|\text{up shift}) = \tfrac{1}{2} p(D \leq -2c|\text{down shift}) = \tfrac{1}{2} p(D \leq -2).$$

The error probability is easily evaluated using the complementary error function. Using the measurement $\delta_1^2=0.140$ and $\delta^2=0.017$, the error probability is only approximately 2% on the 20th copy.

Marking and Detection Strategy

In this section a marking and detection strategy is outlined as the preferred embodiment, which takes advantage of the possibility that the horizontal and vertical projection profiles can be distorted to different degrees.

Each document copy to be sent to a registered recipient is assigned a unique binary identifier. Certain text-lines that satisfy the first condition below are selected to be marked. Each such line carries one bit of the identifier. When an illicit copy is recovered, marking is detected from the text-lines, identifying the registered recipient.

Marking

1. A text line is marked only if it and its two neighbors are all sufficiently long. The neighboring lines, called the control lines, are unmarked. They are used for distortion compensation and estimation of the remaining noise.

2. A marked line is marked both vertically using line shifting and horizontally using word shifting. In line shifting, it is shifted slightly up or down from its normal position. In word shifting, it is divided into three blocks of words and the middle block is shifted slightly left or right whereas the two neighboring blocks remain stationary. In either case the direction of the shift is determined by the unique identifier.

Detection:

1. Scan in the recovered copy, and the original unmarked copy if its bitmap is not already available.

2. Compile the horizontal and the vertical profile from the bitmap image.

3. Compensate for fading, translation and expansion/shrinkage of the entire text.

4. Estimate the probabilities of detection error on the horizontal and the vertical projection profiles.

5. Detect line-shift or word-shift whichever of the horizontal or vertical profile is less noisy.

There are two ways to estimate the error probabilities in Step 4 above. The first method marks the control lines on a page both horizontally and vertically with a predefined shifting pattern that is the same for all copies. Every other control line is shifted up or down. These vertical shifts are detected using the centroid detector described in the next section. The success rate is an estimate of the detection error on the horizontal projection profiles. In the other direction each control line is divided into three groups of words. The middle group is shifted left or right and the neighboring control groups remain stationary. These word-shifts are detected using the correlation detector described in the next section. The success rate is an estimate of the detection error on the vertical profiles.

The second method compares the expressions for error probabilities in centroid and correlation detection. These probabilities depend on the profiles of the unmarked original as well as the variance of the additive noise. The noise variance is estimated from the control lines.

Detection

In this section two detection methods are described. The centroid method measures the distance between the centroid of adjacent blocks and decides whether the middle block has been shifted up or down. The second method treats the profile as a waveform and decides whether it originated from a waveform corresponding to a left or right shifted middle block.

Vertical vs. Horizontal Profiles

Figure 11A:
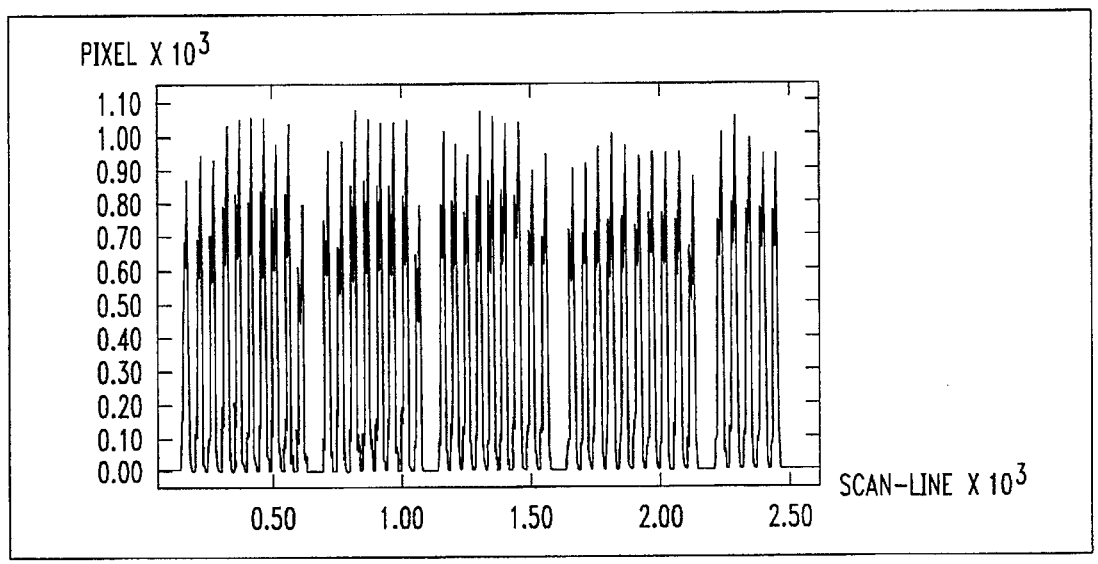
FIG. 11A shows a horizontal profile of a page.

A horizontal profile typically consists of distinct 'columns' and 'valleys'. The 'columns' correspond to text-lines and the 'valleys' to interline spaces. FIG. 11A shows such a profile of the forth copy generation of a page. The bulk of a column is several hundred pixels for the shown scanning resolution. Distortions introduced in printing, photocopying and scanning typically have a magnitude of 15 pixels or less for this example, an order of magnitude smaller. Hence, a simple threshold scheme is sufficient to determine the left and right edges that define a column in the profile. Moreover, since the threshold (on the order of 20 pixels) is small compared with the bulk of a column, an error of a couple scan lines in delineating the column has insignificant effect on the computed centroid. Hence, the centroid method has been very reliable.

Figure 11B:
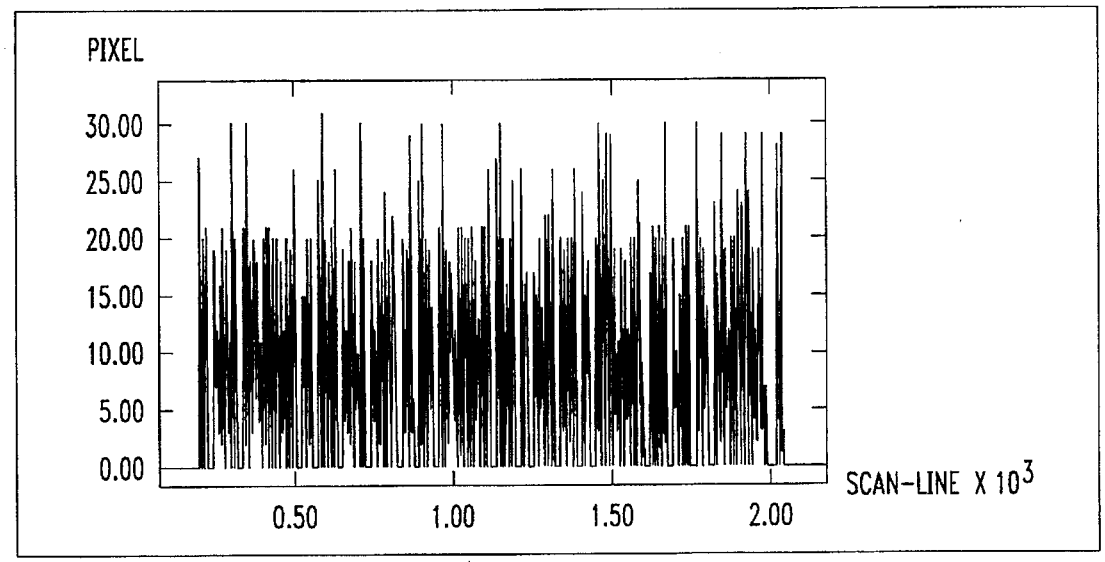
FIG. 11B shows a vertical profile of a text-line.

One is first tempted to use the same procedure to detect word-shifts, with 'columns' in the vertical profile corresponding to words and 'valleys' in between corresponding to interword spaces. The fact that a vertical profile is much shorter and its 'columns' and 'valleys' much less distinguishable makes this approach ineffective. FIG. 11B shows the vertical profile of a line on the same photocopy used in generating FIG. 11A, the 'columns' are almost all less than 30 bits, and the 'valleys' much narrower than in the horizonal profile. It is difficult to accurately identify a 'column' from such a profile. Because of the short profile, an inaccuracy of even a few pixels in delineating such a column (word segmentation) will significantly affect the computed centroid. In addition, the centroid noise has a larger variance for a shorter and wider column. Comparison of FIGS. 11A and 11B suggests that an approximation by a series of Delta functions will be poor for a vertical profile.

Line-shift Detection

The centroid method works well only if each block of the given profile can be accurately delineated. Assume this has been done and we have a profile h and three intervals $[b_1, e_1]$, $[b_2, e_2]$, and $[b_3, e_3]$ that define the three blocks in $h(x)$. This is the original unmarked profile. The centroid of block i, i=1,2,3, is $$c_i = \frac{\int_{b_i}^{e_i} xh(x)dx}{\int_{b_i}^{e_i} h(x)dx}$$

also have the profile $$g(x)=h(x)+N(x), x \in [b_1, e_3]$$

of the marked copy on the same interval $[b_1, e_3]$. Here, the additive noise $N(x)$ models all the distortions not accounted for and introduced by distortion compensation. The control blocks have centroids.

$$U_1=c_1+V_1 \text{ and } U_3=c_3+V_3.$$

The middle block has been shifted by a size $\epsilon > 0$ so that its centroid is $$U_2=c_2+V_2-\epsilon$$

if it is up shifted, and $$U_2=c_2+V_2+\epsilon$$

if it is down shifted. Here, $V_i$, i=1, 2, 3, is random noise that corrupts the centroids $c_i$. To eliminate the effect of translation, the detection is based on the distance $U_i-U_{i-1}$ between adjacent centroids instead of centroid $U_2$ of the middle block. Hence, there is the classical detection problem in which we have to decide whether the middle block has been up or down shifted given the observed values of $U_2-U_1$ and $U_3-U_2$.

Under the assumption that the additive noise $N(x)$ is white zero mean Gaussian, that the centroid noise $V_i$ is approximately zero mean Gaussian whose variance is a function of the uncorrupted profile $h(x)$. Also derived is the maximum likelihood detector that chooses the direction of the shift that is most likely to have caused the observed $U_2-U_1$ and $U_3-U_2$. It minimizes the average probability of decision error when the middle block is equally likely to have been shifted up or down a prior; It is convenient to use as a decision variable the differences $$\Gamma_u:=(U_2-U_1)-(c_2-c_1)$$

$$\Gamma_l:=(U_3-U_2)-(c_3-c_2)$$

of the corrupted centroid separations and the uncorrupted separations. $\Gamma_u$ is the change in the distance of the middle block from the upper control block and $\Gamma_l$ is that from the lower control block. Without noise $\Gamma_u=-\epsilon$ and $\Gamma_l=\epsilon$ if the middle block is upshifted, and $\Gamma_u=\epsilon$ and $\Gamma_l=-\epsilon$ if it is down shifted. Hence, it is reasonable to decide that the middle block is up shifted if $\Gamma_u \leq \Gamma_l$, and down shifted otherwise. With noise, these changes in the distance of the middle block from the control blocks should be weighted by the noise variances in the centroids of the control blocks before comparing them. Note that the decision does not depend on the middle block, except through $\Gamma_u$ and $\Gamma_l$. The maximum likelihood detector, when the observed value of $(\Gamma_u, \Gamma_l)$ is $(\gamma_u, \gamma_l)$ is $$\text{decide upshift if } \frac{\gamma_u}{v_1^2} \leq \frac{\gamma_l}{v_3^2}$$

decide downshift otherwise, where $v_1^2$ and $v_3^2$ are the centroid noise variances of the upper and lower control blocks, respectively.

Word-shift detection

Again, the line is profiled $h(x)$ and three intervals $[b_1, e_1]$, $[b_2, e_2]$, and $[b_3, e_3]$ define the three groups of words. It is assumed that $h(x)=0$ between these intervals. The middle group is shifted slightly while controls groups remain stationary. Let $h^l(x)$ be the resultant profile when the middle block is left shifted by $\epsilon > 0$:

$$h^l(x) = \begin{cases} h(x), x & < b_2-\epsilon \text{ or } x > e_2 \\ h(x+s), & b_2-\epsilon \leq x \leq e_2-\epsilon \\ 0, e_2 & - \epsilon \leq x \leq e_2 \end{cases}$$

and $h^r(x)$ be that when the middle block is right shifted:

$$h^r(x) = \begin{cases} h(x), x & < b_2 \text{ or } x > e_2+\epsilon \\ 0, b_2 & \leq x < b_2+\epsilon \\ h(x-s), & b_2+\epsilon \leq x \leq e_2-\epsilon \end{cases}$$

Naturally, the shift s is smaller than the interblock spacing. The profile $g(x)$ compiled from the illicit copy and after distortion compensation is corrupted by an additive noise, $N(x)$, such that $$g(x)=h^l(x)+N(x), y=b_1, \ldots, e_3$$

if the middle block is left shifted, and $$g(x)=h^r(x)+N(x), y=b_1, \ldots, e_3$$

if it is right shifted.

The decision as to whether the middle block is left or right shifted is based on the observed profile. Under the assumption that N(y) is zero-mean white Gaussian noise, standard procedures lead to the following result.

The maximum likelihood detector given the observed profile g(y) is:

$$\text{decide left shift} \quad \sum_{b_1}^{e_3} g(y)(h^l(y) - h^r(y)) \geq 0$$

decide right shift otherwise where $h^l$ and $h^r$ are computed from the original profile $h(x)$ according to the above equations.

Conclusion

Making and distributing illegitimate copies of documents can be discouraged if each of the original copies is unique, and can be associated with a particular recipient. A particular technique for making text documents unique has been described. Based on text line and word shifting, the technique has been implemented as an experiment to demonstrate that perturbations in spacing that are small enough to be indiscernible to a casual reader can be recovered from a paper copy of the document, even after being copied several times.

In the experiment, the position of the odd numbered lines within each page remained the same while the even numbered lines are moved up or down by a small amount. These lines are then divided into three groups where the center group is shifted either left or right. By selecting different line and word group shifts, information is encoded into the document. The document is then copied ten times. To retrieve the information from the paper copy, the document is scanned back into the computer. Two detection methods have been considered, one based on treating the profile of a line as a waveform, and the other based on the center of mass of each line. Although the centers of mass of the lines are not equally spaced, this technique has been found to be more resilient to the types of distortion encountered in the printing and copying process.

The experiment showed that, depending on the process a document goes through, it could be distorted in the vertical and horizontal directions to very different degrees. To take advantage of such possibility the proposed strategy marks a text line both vertically using line shifting and horizontally using word shifting. Probabilities of detection error on horizontal and vertical projection profiles are estimated from the control lines accompanying the marked line. Line shifts or word shifts are detected horizontal or vertical profiles are less noisy. The maximum likelihood detectors have been given for the centroid and the correlation methods.

The differential encoding mechanism has been selected because the types of distortion that have been encountered have canceled out when differences between adjacent lines are considered. In the experiments, the lines in the document are moved up or down by as little as 1/300 inch, the document is copied as many as ten times, then the document is scanned into a computer and decoded. For the experiment that has been conducted, the centroid decoding mechanism has provided an immeasurably small error rate.

Obviously, numerous modifications and variations of the present invention are possible in light of the above teachings. It is therefore understood that within the scope of the appended claims, the invention may be practiced otherwise than as specifically described herein.

What is claimed is:

1. A method of deterring illicit copying of electronically published documents, comprising the steps of:
   electronically creating a plurality of copies of a document for distribution to a plurality of subscribers;
   encoding each of said plurality of copies of said document with a unique identification code, said identification code being based on a combination of line-shift coding and word-shift coding; and
   creating a codebook to correlate each such identification code to a particular one of said plurality of subscribers.

2. The method of claim 1 wherein the step of encoding further comprises altering a document format file to shift locations of at least one line relative to other lines contained in said at least one document to uniquely encode each of said at least one document.

3. The method of claim 2 wherein at least one line immediately preceding said shifted line and at least one line immediately succeeding said shifted line are not shifted.

4. The method of claim 1 wherein the step of encoding further comprises altering a document format file to shift locations of at least one word relative to the other words contained in said at least one document to uniquely encode each of said at least one document.

5. The method of claim 4 wherein said shifted at least one word further comprises a block of words where at least one block of words immediately preceding said shifted block of words and at least one block of words immediately succeeding said shifted block are not shifted.

6. The method of claim 1 wherein said line-shift coding and word-shift coding are encoded on a same line.

7. The method of claim 1 wherein the step of encoding further comprises altering a document bitmap image to shift locations of at least one line relative to other lines contained in said at least one document to uniquely encode each of said at least one document.

8. The method of claim 7 wherein at least one line immediately preceding said shifted line and at least one line immediately succeeding said shifted line are not shifted.

9. The method of claim 1 wherein the step of encoding further comprises altering a document bitmap image to shift locations of at least one word relative to the other words contained in said at least one document to uniquely encode each of said at least one document.

10. The method of claim 9 wherein said shifted at least one word further comprises a block of words where at least one block of words immediately preceding said shifted block of words and at least one block of words immediately succeeding said shifted block are not shifted.

11. A method of deterring illicit copying of a electronically published document, comprising the steps of:
   detecting a unique identification code on a copy of said electronically published document; and
   comparing said detected unique identification code on said copy of said electronically published document to a codebook to determine a particular one of a plurality of subscribers to which said unique identification code correlates, said identification code being based on a combination of line-shift coding and word-shift coding.

12. The method of claim 11 wherein said step of detecting said unique identification code further comprises the steps of:

inputting said copy of said at least one electronically published document into a bitmap image;

analyzing said bitmap image to determine its horizontal and vertical projection profiles; and detecting and decoding said unique identification code from said horizontal and vertical projection profiles.

13. The method of claim 12 wherein the step of analyzing said bitmap image includes compiling said horizontal and vertical projection profiles, and compensating for and reducing noise on said bitmap image.

14. The method of claim 12 further comprises the step of estimating probabilities of detection error on said horizontal and vertical projection profiles.

15. The method of claim 12 wherein the step of detecting and decoding is based on centroid differential determination.

16. The method of claim 12 wherein the step of detecting and decoding is based on waveform correlation determination.

* * * * *